US005412570A

United States Patent [19]

Gruler et al.

[11] Patent Number: 5,412,570

[45] Date of Patent: May 2, 1995

[54] APPARATUS FOR RECORDING DRIVING DATA WITH A TEMPORAL RESOLUTION ADAPTED TO THE SIGNAL SHAPE OF ANALOG MEASUREMENT SIGNALS

[75] Inventors: Martin Gruler, Aixheim; Helmut Bacic, Königsfeld; Hartmut Schultze, Villingen-Schwenningen, all of Germany

[73] Assignee: Mannesmann Kienzle GmbH, Villingen, Germany

[21] Appl. No.: 81,347

[22] PCT Filed: Nov. 4, 1992

[86] PCT No.: PCT/EP92/02529

§ 371 Date: Jun. 29, 1993

§ 102(e) Date: Jun. 29, 1993

[87] PCT Pub. No.: WO93/10510

PCT Pub. Date: May 27, 1993

[30] Foreign Application Priority Data

Nov. 11, 1991 [DE] Germany ........................ 41 36 968.8

[51] Int. Cl.[6] .............................................. G06F 13/00

[52] U.S. Cl. .......................... 364/424.04; 364/424.03; 377/16; 377/26

[58] Field of Search ...................... 364/424.04, 424.03, 364/424.05; 360/5; 377/16, 26; 340/438, 439

[56] References Cited

U.S. PATENT DOCUMENTS 4,409,670 10/1983 Herndon et al. .................... 364/900
4,476,116 9/1984 Ratchford ........................... 364/424
4,533,962 8/1985 Decker et al. .......................... 360/5
4,638,289 1/1987 Zottnik ............................ 340/52 H
4,807,179 2/1989 Clere et al. .......................... 364/900
4,987,541 1/1991 Levente et al. ................ 364/424.04
4,992,943 2/1991 McCracken .................... 364/424.04

*Primary Examiner*—Kevin J. Teska
*Assistant Examiner*—Susan Wieland
*Attorney, Agent, or Firm*—Anderson Kill Olick & Oshinsky

[57] ABSTRACT

An apparatus for recording driving data which comprises a data gathering device, which further comprises a sensory measuring device, a control unit, an A/D converter, a plurality of parallel ring storage devices and a semiconductor storage device. Analog measurement signals, which are continuously detected by the sensory measuring device, for recording a vehicle movement, are continuously sensed by the control unit with two different frequencies after being digitized into digital measurement signals in the A/D converter. The digital signals are stored in the plurality of parallel ring storage devices with clock frequencies. Upon a detection of an accident, a trigger signal causes the control unit to stop storing the digital measurement signals in a first of the plurality of parallel ring storage devices with a lower clock frequency after a delay so that a storing of measurement data in the first of the plurality of parallel ring storage devices terminates one of after an after-running period and as a result of a stopping of the vehicle. The control unit interrupts a further storage of the digital measurement signals in a second of the plurality of parallel ring storage devices with a higher clock frequency at the occurrence of the trigger signal and causes the digital measurement signals to be stored in the semiconductor storage device. The semiconductor storage device is arranged in parallel with the second of the plurality of ring storage devices and has the higher clock frequency for the duration of the trigger signal.

12 Claims, 2 Drawing Sheets

APPARATUS FOR RECORDING DRIVING DATA WITH A TEMPORAL RESOLUTION ADAPTED TO THE SIGNAL SHAPE OF ANALOG MEASUREMENT SIGNALS

FIELD OF THE INVENTION

The invention relates to an apparatus for recording driving data with a temporal resolution adapted to the signal shape of analog measurement signals.

BACKGROUND OF THE INVENTION

A data gathering device for recording driving data which provides verification of the details of an accident in order to settle the question of fault in an objective manner by reconstructing the movement path of the vehicle is acted upon by the measurement signals of its sensors which continuously detect the driving dynamics of the vehicle. This is effected substantially with two significantly different signal shapes.

In normal driving, predominantly low-frequency signals with relatively small signal amplitudes are detected. As a rule, these signals are recorded over a longer period of time, whereas an accident situation is characterized in that higher-frequency signals with a relatively large signal amplitude are available for recording for a short period of time, these signals generally being caused by a collision.

Data gathering devices of this type should be capable of recording as much data as possible. On the other hand, in a low-cost device suitable for use in vehicles and intended for multiple applications the storage capacity must be kept within an economically reasonable limit. Therefore, it is necessary to search for arrangements which provide a way of meeting these conflicting requirements.

It is known from EP-118 818 B1 that the measurement signals detected by an accident-data writing device by means of sensors are sensed in a fixed cycle and stored as driving data. However, a fixed clock frequency cannot meet the aforementioned requirements. An accident situation whose significant, analog measurement signals are generally only present for less than 1 second cannot be detected with sufficient accuracy by an individual clock frequency selected for normal driving, since the resolution, i.e. the number of measurement points which are stored, is too low. On the other hand, a constantly high sensing rate would result in a scarcely meaningful flood of data which would be difficult to manage.

One solution might be simply to increase the sensing rate by an appropriate degree at the occurrence of the accident. But this step has the considerable disadvantage that precisely the measurement signals of the initial phase of the accident cannot be detected with a high resolution because of the unavoidable response time for the jump in frequency resulting from the required period for detecting the accident event, the electronic signal transit times, and the build-up phase for the higher sensing frequency.

SUMMARY OF THE INVENTION

The present invention has the object of developing the known arrangement for recording driving data in such a way that, while taking into account the limited storage capacity, a high temporal resolution of the signal shape of the analog measurement signal is ensured at the occurrence of an accident already in its initial phase.

This object is met by an arrangement for recording driving data with a temporal resolution adapted to the signal shape of analog measurement signals which is characterized by the following features. The analog measurement signals, which are continuously detected by a sensory measuring device of a data gathering device for the purpose of recording the movement of a vehicle, are continuously sensed by a control unit with two different frequencies after being digitized in an A/D converter and are stored in two parallel ring storages with clock frequencies. When an accident is detected, a trigger signal causes the control unit to stop storing the measurement signals in the ring storage with the lower clock frequency after a delay so that the storing of the measurement data in the ring storage terminates after an after-running period or as a result of stopping of the vehicle. The control unit also interrupts further storage of the measurement signals in the ring storage with higher clock frequency at the occurrence of the trigger signal and causes the measurement signals to be stored in an additional semiconductor storage which is arranged in parallel with the ring storage and has the higher clock frequency for the duration of the trigger signal, and possibly including a fixed after-running time after the extinguishing of the trigger signal.

The solution according to the invention ensures that the measurement signals of an accident situation are detected at a high sensing rate precisely at the moment of its occurrence in that the data are permanently read into the ring storages at both frequencies. Thus, detection of an accident does not trigger a jump in frequency. Moreover, the selected storage control has the advantage that the data occurring shortly before the accident are also detected at a high resolution. Since the storage of the measurement signals in the ring storage clocked at the higher frequency is stopped immediately at the moment the accident is detected, the data stored over the loop period are retained. This advantage decisively improves the confidence factor of the data detected by the data gathering device, since the possibility of reconstructing the movement path of the vehicle is substantially improved by finely structured measurement data. The purpose of this data recording consists precisely in an unequivocal recording of the details of an accident with as few gaps as possible.

The invention is explained in more detail with reference to the two drawings described below:

DESCRIPTION OF THE PREFERRED EMBODIMENT

Figure 1:
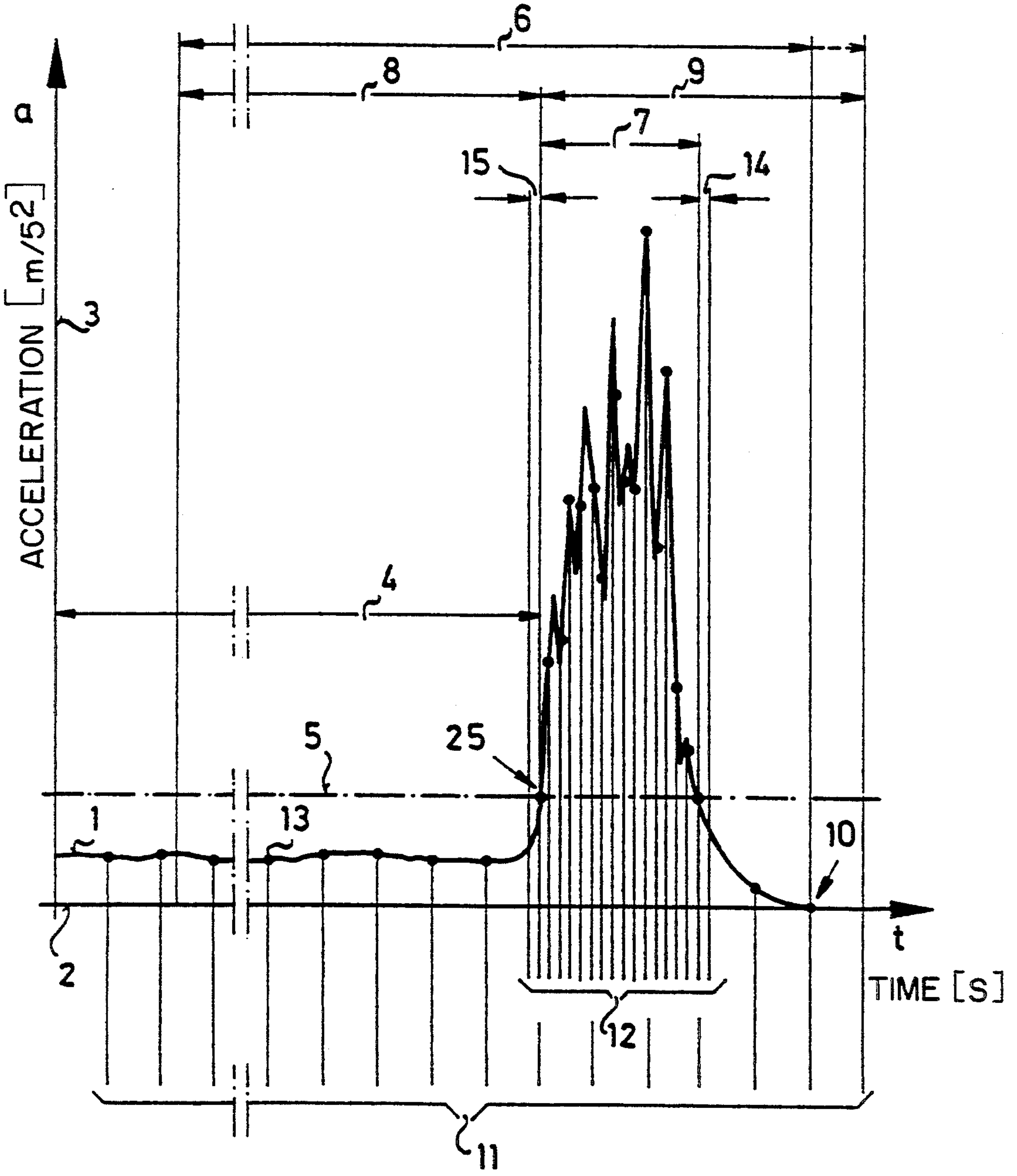
FIG. 1 shows the typical signal shapes to be detected.

In FIG. 1, an analog measurement signal 1, e.g. the longitudinal or transverse acceleration of the vehicle, is plotted on the time axis 2. The ordinate 3 indicates the rate of the signal 1. During normal driving operation, i.e. in time segment 4, the absolute rate of the measurement signal is relatively low. The amplitude fluctuations are also relatively slow. If an accident occurs, the rate of the measurement signal 1 changes abruptly and exceeds a fixed threshold 5 for triggering the storage control according to the invention and the accident is detected as such by the device.

Although this is not described at length for the sake of simplicity, it should be mentioned that accident detection can also include criteria and calculating operations going beyond this simple exceeding of the threshold value. For instance, combinations with other sensor signals can be used for accident detection. In addition to automatic accident detection, the storage control according to the invention could also be triggered manually by actuating an operating control, e.g. the hazard flasher system. It is of decisive importance that the accident be detected as such and that this detection trigger the storage control sequence according to the invention.

The actual collision phase 7 is a partial time period of the accident recording time 6 and is recorded in the fast-clock data storage branch with high resolution in addition to the normal data recording. The higher-order accident recording time 6 ends either with the stopping 10 of the vehicle, characterized by the absence of the analog measurement signal 1, or after the expiration of a fixed after-running time 9 beginning with the time of the occurrence of the trigger signal 25. The accident recording time 6, which can amount to a total of 45 seconds for example, accordingly includes a time segment 8 prior to the occurrence of the trigger signal 25 and an after-running time 9. In normal driving operation, a low-frequency sensing rate 11 (with frequency f1) of the analog measurement signals 1 which are permanently detected by the sensory measuring device is sufficient for data storage, since the storage of more measurement points 13 does not increase the informational content in a usable way. However, during the actual accident, as many measurement points 13 as possible are to remain stored at the higher sensing rate 12 predetermined by frequency f2.

Figure 2:
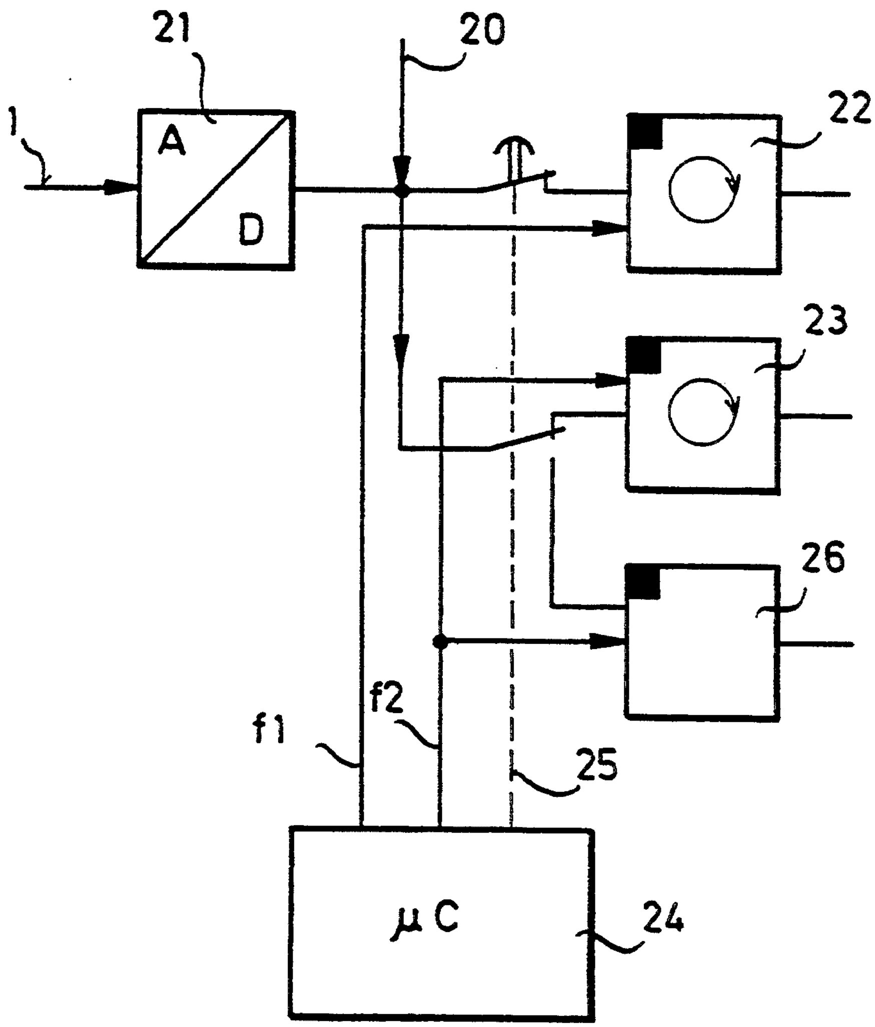
FIG. 2 shows a simplified block wiring diagram of the storage control.

FIG. 2 illustrates the storage control. Analog measurement signals 1 are continuously detected by the sensory measuring device of the data gathering device and are fed via an A/D converter 21. These digitized measurement signals are fed—either directly or in combination with other synchronously detected digital signals 20 to form data words—to at least two ring storages 22 and 23 which are arranged in parallel and read in the data words in a different clock. The respective clock frequencies f1 and f2 are predetermined by a control unit 24, where f1 designates the storage frequency for the ring storage 22 and f2 designates the storage frequency for the ring storage 23. The sensing frequencies f1 and f2 are different and are to be selected in such a way that f1 is suitable for sensing the low-frequency measurement signals of normal driving operation and f2 is of a correspondingly higher frequency to enable a high resolution of the higher-frequency measurement signals occurring in accident situations. It has proven advisable to select f1 at 25 Hz and f2 at 500 Hz.

When an accident is detected, the control unit 24 triggers a trigger signal 25 which stops the continuous sensing and storage of the measurement signals in the ring storages 22 and 23. This stopping of the storage of the measurement signals in the ring storages 22 and 23, and accordingly the conservation of the storage contents, is effected according to different criteria and at different times for the two storages. The storage in the ring storage 22 storing the measurement signals at the low frequency f1 is stopped after a delay so that the recording in this storage ends with the stepping 10 of the vehicle or, at the latest, after the expiration of the fixed after-running time 9. This after-running time 9 can be fixed at approximately 15 seconds for detecting events subsequent to the actual accident. When the trigger signal 25 occurs, the storage of the measurement signals in the ring storage 23, which is effected at the higher frequency f2, is stopped and the subsequent data are read into an additional, parallel electronic semiconductor storage 26, not a ring storage, at frequency f2. This storage is effected for the duration of the trigger signal 25 marking the accident situation. When the trigger signal 25 is extinguished, the storage 26 terminates the high-frequency data storage in the preferred construction also with a delay in time after a brief after-running time 14 for which 100 ms has proved sufficient. Driving data which are sensed at high frequency are accordingly available via the loop period 15 of the ring storage 23 and the recording period of the storage 26, which latter includes the duration of the trigger signal 25 which corresponds to the collision phase 7 and a fixed after-running time 14.

The time segments 14 and 15 in FIG. 1 are shown in FIG. 1, in the correct order of magnitude in relation to the duration of the collision phase 7, for the sake of simplicity. However, there are actually a multitude of measurement points 13 within these time segments 14 and 15. In the preferred construction, there are approximately 50 measurement points.

These finely structured driving data can be associated, with respect to time, with the rough grid of data stored in the ring storage 22, in such a way, that when the trigger signal 25 occurs in the two ring storages 22 and 23, the current clock time, in the event that the data gathering device is outfitted with a real-time clock or another suitable marking, is stored simultaneously. Accordingly, it is possible to correlate the two time grids formed by the different sensing frequencies f1 and f2 during subsequent evaluation of the stored data.

The arrangement described herein can be constructed repeatedly in the data gathering device for recording a succession of accidents. In particular, the fast-clock data storage branch, including the ring storage 23 and the semiconductor storage 26, can be constructed repeatedly in the preferred embodiment form so that a plurality of collisions, which occur within the after-running time 9 associated with the higher-order ring storage 22 and whose duration is very short in relation to the after-running time 9, can be recorded individually. Every new impact then activates the next parallel data storage branch as soon as a free data storage branch of this type is available again.

We claim:

1. An apparatus for recording driving data with a temporal resolution which corresponds to the signal shape of analog measurement signals, which comprises:
   a data gathering device, which further comprises:
      a sensory measuring device, wherein said sensory measuring device continuously detects analog measurement signals for recording a vehicle movement;
      an A/D converter for digitizing said analog measurement signals into digital measurement signals;
      a control unit, wherein said control unit continuously senses said digital measurement signals;
      a plurality of parallel ring storage devices, wherein said digital signals are stored in said plurality of parallel ring storage devices with clock frequencies; and a semiconductor storage device, wherein, upon a detection of an accident, a trigger signal causes said control unit to stop storing said digital measurement signals in a first of said plurality of parallel ring storage devices with a lower clock frequency after a delay so that a storing of measurement data in said first of said plurality of parallel ring storage devices terminates after an after-running period or as a result of a stopping of the vehicle;

wherein said control unit interrupts a further storage of said digital measurement signals in a second of said plurality of parallel ring storage devices with a higher clock frequency at the occurrence of said trigger signal and causes said digital measurement signals to be stored in said semiconductor storage device, wherein said semiconductor storage device is arranged in parallel with said second of said plurality of ring storage devices and has said higher clock frequency for the duration of said trigger signal.

2. The apparatus of claim 1, wherein a marker is set in each of said plurality of parallel ring storage devices upon an occurrence of said trigger signal for correlating their data contents.

3. The apparatus of claim 2, further comprising:

a first data storage branch which comprises:

said second of said plurality of parallel ring storage devices; and said semiconductor storage device, wherein said data storage branch has said higher clock frequency, and further wherein said data storage branch is a multiple parallel construction within said apparatus, and further wherein a next free storage branch is activated by a new impact with an after-running period.

4. The apparatus of claim 1, further comprising:

a first data storage branch which comprises:

said second of said plurality of parallel ring storage devices; and said semiconductor storage device, wherein said data storage branch has said higher clock frequency, and further wherein said data storage branch is a multiple parallel construction within said apparatus, and further wherein a next free storage branch is activated by a new impact with an after-running period.

5. The apparatus of claim 1, which further comprises:

a means for recording successive accidents in a similar manner.

6. The apparatus of claim 1, which further comprises:

a means for automatically triggering said trigger signal.

7. The apparatus of claim 1, which further comprises:

a means for manually triggering said trigger signal.

8. The apparatus of claim 7, wherein said manual triggering means is an accident-related operating control device.

9. An apparatus for recording driving data with a temporal resolution which corresponds to the signal shape of analog measurement signals, which comprises:

a data gathering device, which further comprises:

a sensory measuring device, wherein said sensory measuring device continuously detects analog measurement signals for recording a vehicle movement;

an A/D converter for digitizing said analog measurement signals into digital measurement signals;

a control unit, wherein said control unit continuously senses said digital measurement signals;

a plurality of parallel ring storage devices, wherein said digital signals are stored in said plurality of parallel ring storage devices with clock frequencies; and a semiconductor storage device, wherein, upon a detection of an accident, a trigger signal causes said control unit to stop storing said digital measurement signals in a first of said plurality of parallel ring storage devices with a lower clock frequency after a delay so that a storing of measurement data in said first of said plurality of parallel ring storage devices terminates after an after-running period or as a result of a stopping of the vehicle;

wherein said control unit interrupts a further storage of said digital measurement signals in a second of said plurality of parallel ring storage devices with a higher clock frequency at the occurrence of said trigger signal and causes said digital measurement signals to be stored in said semiconductor storage device, wherein said semiconductor storage device is arranged in parallel with said second of said plurality of ring storage devices and has said higher clock frequency for the duration of said trigger signal, and which further has a fixed after-running time after an extinguishment of said trigger signal.

10. The apparatus of claim 9, wherein a marker is set in each of said plurality of parallel ring storage devices upon an occurrence of said trigger signal for correlating their data contents.

11. The apparatus of claim 10, further comprising:

a first data storage branch which comprises:

said second of said plurality of parallel ring storage devices; and said semiconductor storage device, wherein said data storage branch has said higher clock frequency, and further wherein said data storage branch is a multiple parallel construction within said apparatus, and further wherein a next free storage branch is activated by a new impact with an after-running period.

12. The apparatus of claim 9, further comprising:

a first data storage branch which comprises:

said second of said plurality of parallel ring storage devices; and said semiconductor storage device, wherein said data storage branch has said higher clock frequency, and further wherein said data storage branch is a multiple parallel construction within said apparatus, and further wherein a next free storage branch is activated by a new impact with an after-running period.

* * * * *

UNITED STATES PATENT AND TRADEMARK OFFICE
CERTIFICATE OF CORRECTION

PATENT NO. : 5,412,570

DATED : May 2, 1995

INVENTOR(S) : Martin Gruler et al.

It is certified that error appears in the above—identified patent and that said Letters Patent is hereby corrected as shown below:

Fig. 1, Axis of Ordinates, "$m/5^2$" should read --$m/s^2$--.

Signed and Sealed this

Twenty-second Day of August, 1995

Attest:

Bruce Lehman

BRUCE LEHMAN

*Attesting Officer*

*Commissioner of Patents and Trademarks*